United States Patent
Hindson

(10) Patent No.: US 9,366,554 B2
(45) Date of Patent: Jun. 14, 2016

(54) REAL TIME RETENTION CHECK TOOL

(71) Applicant: GM Global Technology Operations LLC, Detroit, MI (US)

(72) Inventor: Paul D. Hindson, New Baltimore, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 14/186,284

(22) Filed: Feb. 21, 2014

(65) Prior Publication Data

US 2015/0241253 A1    Aug. 27, 2015

(51) Int. Cl.
*G01M 1/14* (2006.01)
*G01D 18/00* (2006.01)
*G01D 3/08* (2006.01)

(52) U.S. Cl.
CPC . *G01D 18/00* (2013.01); *G01D 3/08* (2013.01)

(58) Field of Classification Search
CPC ........ G01P 21/00; G01D 18/00; G01N 29/30; G01M 13/005; G01M 13/028; G01M 13/021; G01M 13/022
USPC .................................. 73/1.82, 1.01
See application file for complete search history.

(56) References Cited

U.S. PATENT DOCUMENTS 8,355,856 B2 * 1/2013 Hartrey ............... F02D 41/1497
                                                    123/406.23
2002/0065171 A1 * 5/2002 Raber .................... F16D 21/06
                                                    477/175

* cited by examiner

*Primary Examiner* — Lisa Caputo
*Assistant Examiner* — Nigel Plumb
(74) *Attorney, Agent, or Firm* — BrooksGroup

(57) ABSTRACT

A number of variations may include a method that may include providing a first part that may include a snap ring, a second part, and a retention check tool that may include an accelerometer. The method may further include assembling the first part and the second part such that the snap ring abuts the second part thereby producing vibration. The method may further include detecting the vibration of the snap ring and generating a corresponding first signal representing the vibration of the snap ring. The method may further include measuring a difference between the first signal and a predetermined baseline signal via the controller to determine a pass or fail status of the first signal. The method may further include generating a second signal representing the pass or fail status of the first signal and indicating the pass or fail status of the first signal.

9 Claims, 2 Drawing Sheets

REAL TIME RETENTION CHECK TOOL

TECHNICAL FIELD

The field to which the disclosure generally relates includes manufacturing tools and assembly retention tools.

BACKGROUND

In manufacturing processes, various methods may be employed to check that certain parts have been installed correctly within an assembly.

SUMMARY OF ILLUSTRATIVE VARIATIONS

A number of variations may include a method that may include providing a first part that may include a snap ring, a second part constructed and arranged to receive the first part, and a retention check tool that may include a housing and an accelerometer. The method may further include assembling the first part and the second part whereby the first part may be connected to the second part such that the snap ring abuts the second part thereby producing vibration. The method may further include detecting the vibration of the snap ring via the retention check tool wherein the retention check tool measures the vibration of the snap ring and generates a corresponding first signal representing the vibration of the snap ring and transmits the first signal to a controller. The method may further include measuring a difference between the first signal and a predetermined baseline signal via the controller to determine a pass or fail status of the first signal. The method may further include generating a second signal representing the pass or fail status of the first signal and indicating the pass or fail status of the first signal.

A number of variations may also include a product that may include a housing that may include at least four side walls, an upper portion, and a lower portion defining a cavity, and an elongated joint extending from one of the at least four side walls defining a channel in communication with the cavity. The product may also include a proximity sensor that may be disposed within the cavity, an accelerometer that may be disposed within the cavity being constructed and arranged to detect vibrational input and convert the vibrational input into a first signal, and an indicator that may be disposed on an outer surface of the housing. The product may also include an arm affixed to the elongated joint that may include a handle and at least one bracket. At least one wire may be in electronic communication with the proximity sensor, accelerometer, indicator, and a controller, wherein the wire may be held in place against the arm via the at least one bracket. The wire may extend from a controller, through the at least one bracket, through the channel and into the cavity wherein the wire may be in electronic communication with the proximity sensor, accelerometer, and indicator.

A number of variations may also include a method that may include providing a half shaft that may include a snap ring, a transmission constructed and arranged to receive the half shaft, and a retention check tool that may include a housing, a proximity sensor, an accelerometer, an electromagnetic clamp, an indicator, and an arm affixed to the sensor that may include a handle and a wire constructed and arranged to facilitate electronic communication between the retention check tool and a controller. The method may further include attaching the retention check tool to the half shaft or the transmission and assembling the half shaft and the transmission whereby the half shaft may be inserted into the transmission such that the snap ring abuts the transmission thereby producing vibration. The method may further include detecting the vibration of the snap ring via the retention check tool wherein the retention check tool generates a first signal representing the vibration of the snap ring and transmits the first signal to the controller. The method may further include measuring a difference between the first signal and a predetermined baseline signal via the controller to determine a pass or fail status of the first signal. The method may further include quantifying and displaying the first signal and the baseline signal via a display in communication with the controller. The method may further include generating a second signal representing the pass or fail status of the first signal and indicating the pass or fail status of the first signal.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Figure 1:
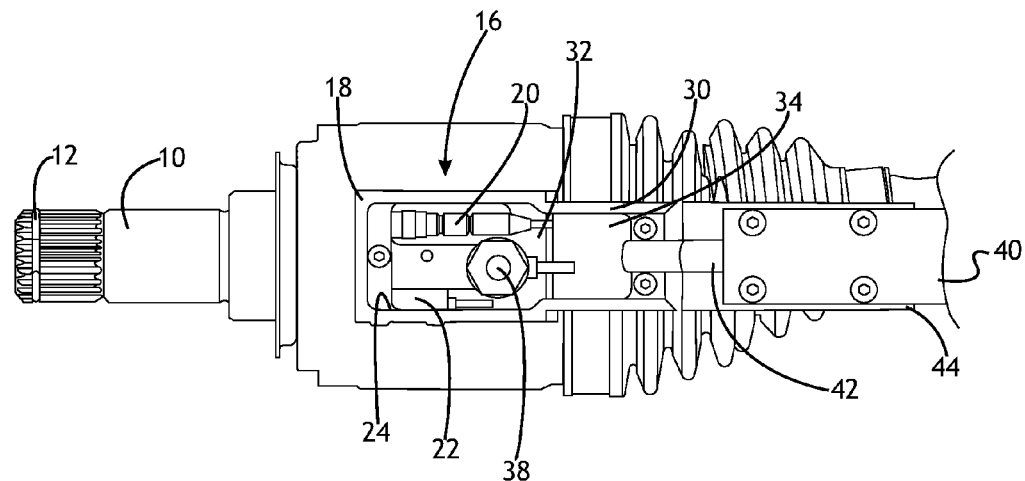
FIG. 1 depicts one variation according to a top-down view.

Referring to FIG. 1, a product may include a retention check tool 16 that may include a housing 18 that may include at least four side walls 24, an upper portion 26, and a lower portion 28 defining a cavity 32, and an elongated joint 30 extending from one of the at least four side walls 24 defining a channel 34 in communication with the cavity 32. The product may also include a proximity sensor 22 that may be disposed within the cavity 32, an accelerometer 30 that may be disposed within the cavity 32 being constructed and arranged to detect vibrational input and convert the vibrational input into a first signal, and an indicator 38 that may be disposed on an outer surface 24, 26, 28 of the housing 18. The product may also include an arm 46 affixed to the elongated joint 30 that may include a handle 40 and at least one bracket 44. At least one wire 42 may be in electronic communication with the proximity sensor 22, accelerometer 20, indicator 38, and a controller (not shown), wherein the wire 42 may be held in place against the handle 40 via the at least one bracket 44. The wire 42 may extend from the controller, through the at least one bracket 44, through the channel 34, and into the cavity 32 wherein the wire 42 may be in electronic communication with the proximity sensor 22, accelerometer 20, and indicator 38. The retention check tool 16 may further include an electromagnetic clamp 36 affixed to the lower portion 28 constructed and arranged to attached the retention check tool 16 to the first part 10 or second part.

Figure 2:
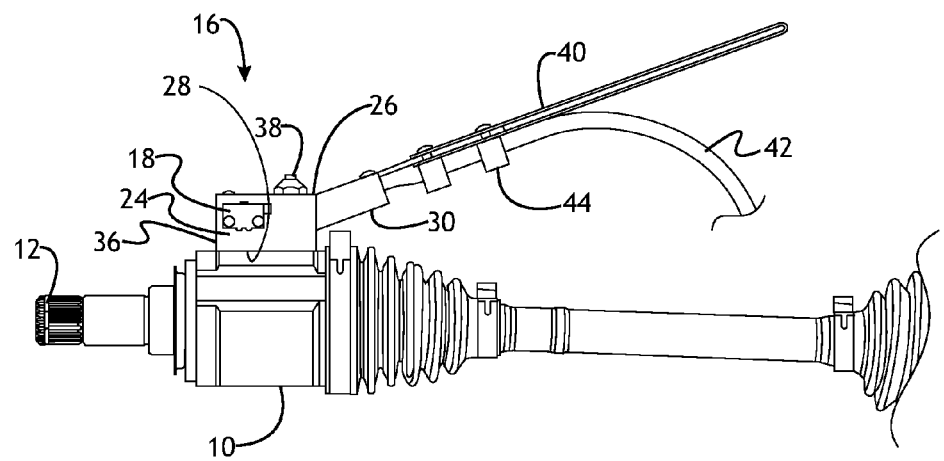
FIG. 2 depicts one variation according to a side view.

Referring to FIG. 2, a method may include providing a first part 10 that may include a snap ring 12, a second part (not shown) constructed and arranged to receive the first part 10, and a retention check tool 16 that may include a housing 18 and an accelerometer 20. The method may further include assembling the first part 10 and the second part whereby the first part 10 may be connected to the second part such that the snap ring 12 abuts the second part thereby producing vibration. The method may further include detecting the vibration of the snap ring 12 via the retention check tool 16 wherein the retention check tool 16 measures the vibration of the snap ring 12 and generates a corresponding first signal representing the vibration of the snap ring 12 and transmits the first signal to a controller (not shown). The method may further include measuring a difference between the first signal and a predetermined baseline signal via the controller to determine a pass or fail status of the first signal. The method may further include generating a second signal representing the pass or fail status of the first signal and indicating the pass or fail status of the first signal.

Figure 3:
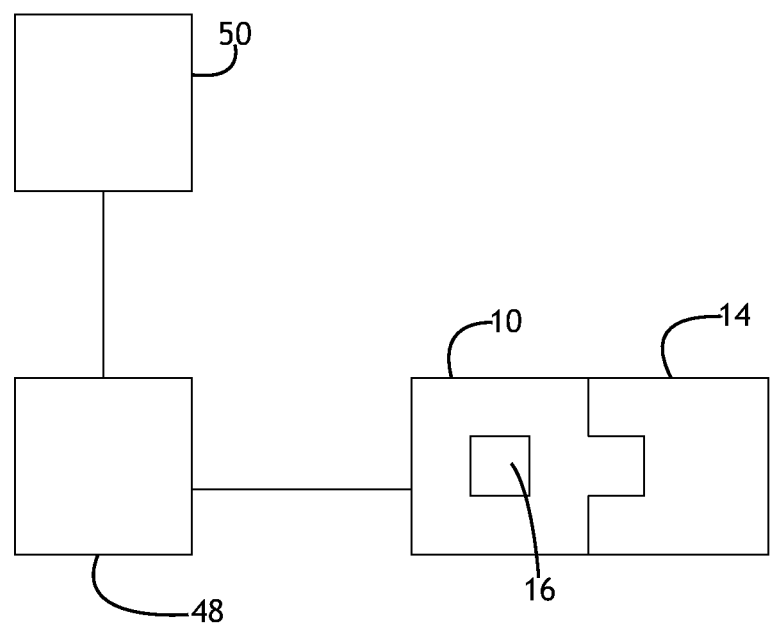
FIG. 3 is a schematic illustration of an electronic control module operatively connected to a retention tool and an indicator according to a number of variations.

Referring to FIG. 3, an electronic control module 48 may be provided and connected to a retention check tool 16 and an indicator 50.

The first part may be one part in an assembly and may include a snap ring located on a portion of the first part such that when the first part is assembly with at least one second part, the snap ring may abut the second part and cause vibration or movement of the snap ring and a quantifiable vibration. The first part may be a half shaft.

The second part may be one part in an assembly may include a snap ring located on a portion of the first part such that when the first part is assembly with at least one first part, the snap ring may abut the first part and cause a quantifiable vibration. The second part may be a transmission or transmission housing.

The retention check tool may include a housing that may include at least four side walls, an upper wall portion, and a lower wall portion. The housing may define a cavity constructed and arranged to enclose an accelerometer, proximity sensor, and other appropriate devices or controllers. The housing may further include an elongated joint extending from the at least four side walls, upper wall portion, or lower wall portion and may define a through channel in communication with the cavity defined by the housing. The retention check tool, in cooperation with the accelerometer and the proximity sensor, may be constructed and arranged to detect, measure, and quantify the magnitude and direction of vibration of the snap ring wherein the retention check tool detects and measures the vibration of the snap ring and generates a corresponding first signal representing the vibration of the snap ring and transmits the first signal to a controller, either internal within the retention check tool, or an external controller. The retention check tool may further measure a difference between the first signal and a predetermined baseline signal via the controller to determine a pass or fail status of the first signal. The retention check tool may further include generating a second signal representing the pass or fail status of the first signal and indicating the pass or fail status of the first signal. The retention check tool may further include a electromagnetic clamp affixed to an outer surfaces of the housing and in electronic communication with a wire. The electromagnetic clamp may be constructed and arranged to temporarily fix the retention check tool to a part or tool and allow for un-attachment of the retention check tool for the part or tool.

The accelerometer may be disposed within the housing and may be constructed and arranged to detect and measure vibration within the retention check tool or a part that may be temporarily attached to the retention check tool. The accelerometer may be single or multi-axis and may be constructed and arranged to detect and measure the magnitude and direction of vibrational input. The accelerometer may further be constructed and arranged to be in electronic communication with an internal controller of the retention check tool or an external controller The proximity sensor may be disposed within the housing and may be constructed and arranged to detect the presence of nearby objects prior to physical contact with those objects. The proximity sensor may be in electronic communication with the indicator and may, in cooperation with the indicator, alert a user directing the retention check tool when the tool or a part is in close proximity to another physical object such as a second part. The proximity sensor may be capacitive, infrared, Doppler, inductive, radar, sonar, ultrasonic or any other suitable type of sensor.

The indicator may be constructed and arranged to alert a user that the assembly of two or more parts has succeeded through communication with the retention check tool, accelerometer, or proximity sensor. The indicator may provide a means for signaling to a user that the snap ring has abutted another part.

The arm may include at least one wire and a handle and may be affixed or hingedly attached to the elongated joint of the housing. The handle may be constructed and arranged to allow a user to control the retention check tool. The wire may be in electronic communication with the accelerometer, proximity sensor, electromagnetic clamp, an internal controller, and an external controller. The wire may be affixed to a portion of the handle via at least one bracket.

A controller may be in electronic communication with the retention check tool, accelerometer, proximity sensor, indicator, wire, and a display. The controller may be constructed and arranged to measure a difference between the first signal and a predetermined baseline signal to determine a pass or fail status of the first signal. The controller may further include generating a second signal representing the pass or fail status of the first signal and indicating the pass or fail status of the first signal. The controller may include a display on which the first signal may be quantified displayed, and compared to the predetermined baseline signal such that a user may determine a pass or fail status of the first signal.

The electronic controller system may include main controller and/or a control subsystem may include one or more controllers (not separately shown) in communication with the components of the system and/or other components of the assembly for receiving and processing sensor input and transmitting output signals. The controller(s) may include one or more suitable processors and memory devices (not separately shown). The memory may be configured to provide storage of data and instructions that provide at least some of the functionality of the method and that may be executed by the processor(s). At least portions of the method may be enabled by one or more computer programs and various system data or instructions, energy stored device data, electric motor generator data and/or electric motor data stored in memory as look-up tables, formulas, algorithms, maps, models, or the like.

In use and in practice, the product may be a real-time retention check tool used to ensure that a first part and a second part have been correctly assembled. A user may clamp the retention check tool to a first part having a snap ring, and assemble the first part with the second part. Upon successful assembly of the first part and the second part, the snap ring may abut the second part and cause a vibration. The retention check tool may detect, measure, and quantify the vibration and generate a first signal corresponding to the vibration of the snap ring. The retention check tool may be in communication with a controller which may compare the first signal against a predetermined baseline signal to ensure that the assembly of the first part and the second part is complete. The controller may generate a pass or fail signal that may be communicated to the retention check tool, which may indicate, either visual, audibly, or both, that the assembly of the first and second parts has succeeded or not succeeded.

According to variation 1, a method may include providing a first part that may include a snap ring, a second part constructed and arranged to receive the first part, and a retention check tool that may include a sensor that may include a housing and an accelerometer. The method may further include assembling the first part and the second part whereby the first part may be connected to the second part such that the snap ring may abut the second part thereby producing vibration. The method may further include detecting the vibration of the snap ring via the retention check tool wherein the sensor may measure the vibration of the snap ring and may generate a corresponding first signal representing the vibration of the snap ring and may transmit the first signal to a controller. The method may further include measuring a difference between the first signal and a predetermined baseline signal via the controller to determine a pass or fail status of the first signal. The method may further include generating a second signal representing the pass or fail status of the first signal and indicating the pass or fail status of the first signal.

Variation 2 may include a method as set forth in variation 1 that may further include quantifying and displaying the first signal and the baseline signal on a display in communication with the controller prior to generating a second signal representing the pass or fail status of the first signal.

Variation 3 may include a method as set forth in variation 1 or 2 that may further include attaching the retention check tool to the first part or the second part prior to assembling the first part and the second part whereby the first part may be connected to the second part such that the snap ring abuts the second part thereby producing vibration.

Variation 4 may include a method as set forth in any of variations 1 through 3 that may further include removing the retention check tool from the first part or the second part after the indication of the pass or fail status of the first signal.

Variation 5 may include a method as set forth in any of variations 1 through 4 wherein the first part may be a half shaft and the second part may be a transmission.

Variation 6 may include a method as set forth in any of variations 1 through 5 wherein the sensor may further include a proximity sensor.

Variation 7 may include a method as set forth in any of variations 1 through 6 wherein the retention check tool may further include an indicator light constructed and arranged to indicate the pass or fail status of the first signal.

Variation 8 may include a product as set forth in any of variations 1 through 7 wherein the retention check tool may further include an audio indicator constructed and arranged to indicate the pass or fail status of the first signal.

Variation 9 may include a product that may include a housing defining a cavity that may include at least four side walls, an upper portion, and a lower portion, and an elongated joint extending from one of the at least four side walls defining a channel in communication with the cavity. The product may further include a proximity sensor disposed within the cavity; an accelerometer disposed within the cavity being constructed and arranged to detect vibrational input and convert the vibrational input into a first signal; an indicator disposed on an outer surface of the housing; an arm affixed to the elongated joint that may include a handle and at least one bracket; at least one wire in electronic communication with the proximity sensor, accelerometer, indicator, and a controller, wherein the wire may be held in place against the arm via the at least one bracket and extends from the controller, through the at least one bracket, through the channel and into the cavity wherein the wire may be in electronic communication with the proximity sensor, accelerometer, and indicator.

Variation 10 may include a product as set forth in variation 9 that may further include an electromagnetic clamp disposed on an outer surface of the housing and in electronic communication with the at least one wire and controller.

Variation 11 may include a product as set forth in any of variations 9 through 10 wherein the indicator may be an illumination source.

Variation 12 may include a product as set forth in any of variations 9 through 11 wherein the indicator may be an audio source.

Variation 13 may include a method that may include providing a half shaft that may include a snap ring, a transmission constructed and arranged to receive the half shaft, and a retention check tool that may include a housing, a proximity sensor, an accelerometer, an electromagnetic clamp, an indicator, and an arm affixed to the sensor that may include a handle and a wire constructed and arranged to facilitate electronic communication between the sensor and a controller. The method may further include attaching the sensor to the half shaft or the transmission and assembling the half shaft and the transmission whereby the half shaft may be inserted into the transmission such that the snap ring abuts the transmission thereby producing vibration. The method may further include detecting the vibration of the snap ring via the retention check tool wherein the retention check tool generates a first signal representing the vibration of the snap ring and transmits the first signal to the controller. The method may further include measuring a difference between the first signal and a predetermined baseline signal via the controller to determine a pass or fail status of the first signal. The method may further include quantifying and displaying the first signal and the baseline signal via a display in communication with the controller. The method may further include generating a second signal representing the pass or fail status of the first signal and indicating the pass or fail status of the first signal.

The above description of variations of the invention is merely demonstrative in nature and, thus, variations thereof are not to be regarded as a departure from the spirit and scope of the inventions disclosed within this document.

What is claimed is:

1. A method comprising:
   providing a first part comprising a snap ring, a second part constructed and arranged to receive the first part, and a retention check tool comprising a sensor comprising a housing and an accelerometer;
   assembling the first part and the second part whereby the first part is connected to the second part such that the snap ring abuts the second part thereby producing vibration;
   detecting the vibration of the snap ring via the retention check tool wherein the sensor measures the vibration of the snap ring and generates a corresponding first signal representing the vibration of the snap ring and transmits the first signal to a controller;

measuring a difference between the first signal and a predetermined baseline signal via the controller to determine a pass or fail status of the first signal;

generating a second signal representing the pass or fail status of the first signal; and indicating the pass or fail status of the first signal.

2. The method according to claim 1, further comprising:

quantifying and displaying the first signal and the baseline signal on a display in communication with the controller prior to generating a second signal representing the pass or fail status of the first signal.

3. The method according to claim 1, further comprising:

attaching the retention check tool to the first part or the second part prior to assembling the first part and the second part whereby the first part is connected to the second part such that the snap ring abuts the second part thereby producing vibration.

4. The method according to claim 3, further comprising:

removing the retention check tool from the first part or the second part after the indication of the pass or fail status of the first signal.

5. The method according to claim 1, wherein the first part is a half shaft and the second part is a transmission.

6. The method according to claim 1, wherein the sensor further comprises a proximity sensor.

7. The method according to claim 1, wherein the retention check tool further comprises an indicator light constructed and arranged to indicate the pass or fail status of the first signal.

8. The method according to claim 1, wherein the retention check tool further comprises an audio indicator constructed and arranged to indicate the pass or fail status of the first signal.

9. A method comprising:

providing a half shaft comprising a snap ring, a transmission constructed and arranged to receive the half shaft, and a retention check tool comprising a housing, a proximity sensor, an accelerometer, an electromagnetic clamp, and an indicator, and an arm affixed to the sensor comprising a handle and a wire constructed and arranged to facilitate electronic communication between the sensor and a controller, attaching the sensor to the half shaft or the transmission;

assembling the half shaft and the transmission whereby the half shaft is inserted into the transmission such that the snap ring abuts the transmission thereby producing vibration;

detecting the vibration of the snap ring via the retention check tool wherein the retention check tool generates a first signal representing the vibration of the snap ring and transmits the first signal to the controller;

measuring a difference between the first signal and a predetermined baseline signal via the controller to determine a pass or fail status of the first signal;

quantifying and displaying the first signal and the baseline signal via a display in communication with the controller;

generating a second signal representing the pass or fail status of the first signal; and indicating the pass or fail status of the first signal.

\* \* \* \* \*